Feb. 27, 1951 T. W. JONES ET AL 2,543,368
LATERALLY FLEXIBLE POWER-OPERATED CONVEYER
Filed Nov. 13, 1946 3 Sheets-Sheet 2
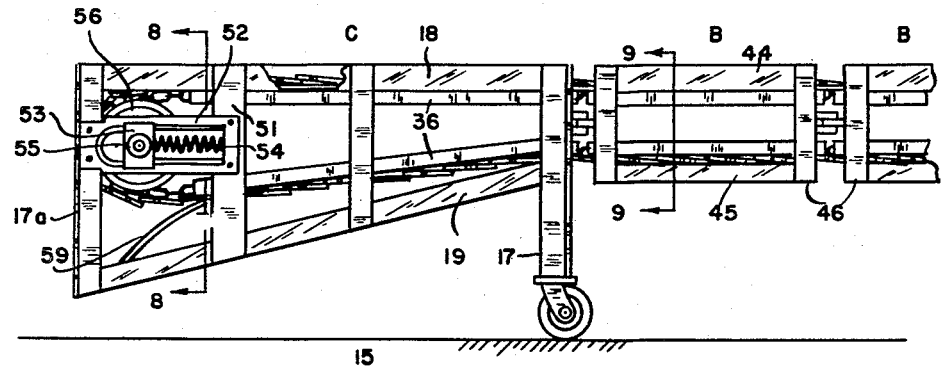
FIG. 7
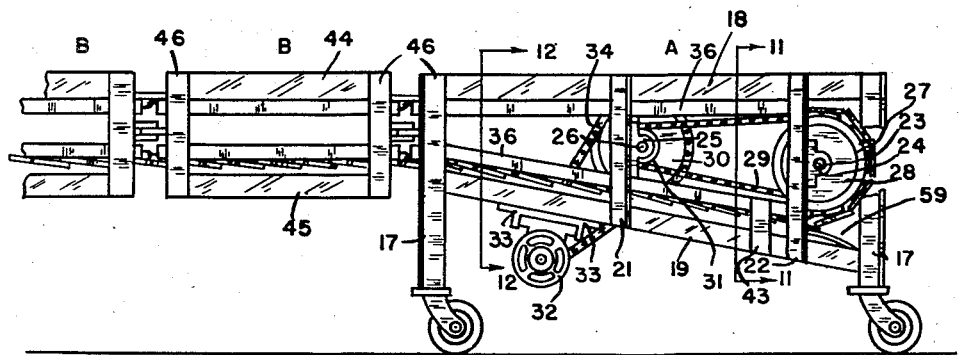
FIG. 6
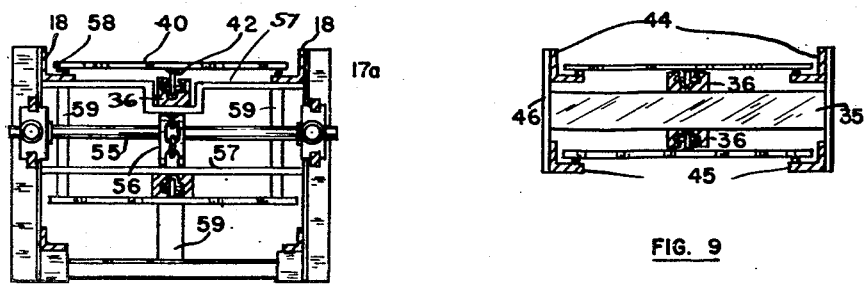
FIG. 8
FIG. 9
INVENTOR.
TAZE W. JONES
NELLO E. CIOCCHETTI
BY Martin E. Anderson
ATTORNEY Feb. 27, 1951 T. W. JONES ET AL 2,543,368
LATERALLY FLEXIBLE POWER-OPERATED CONVEYER
Filed Nov. 13, 1946 3 Sheets-Sheet 3

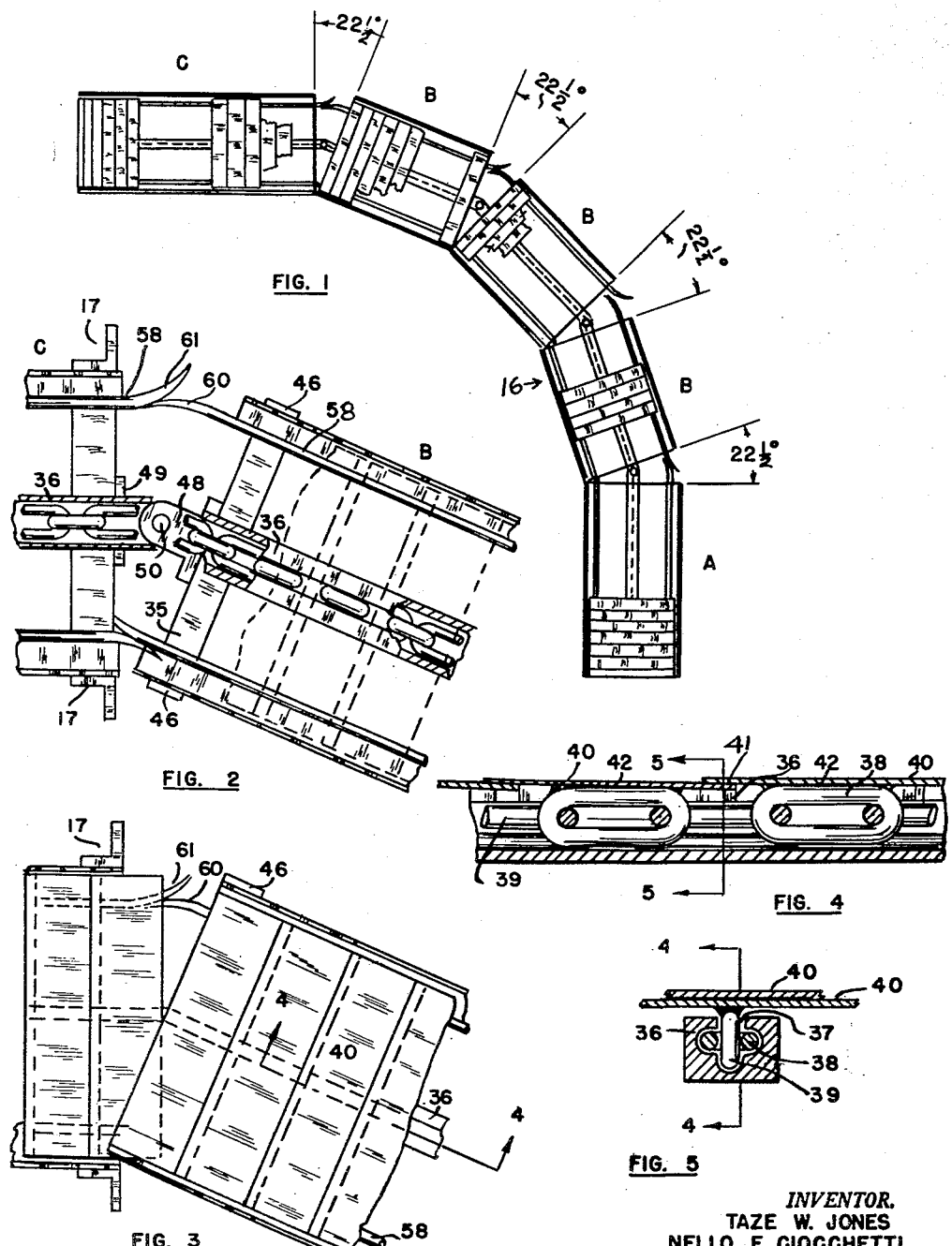

*INVENTOR.*
TAZE W. JONES
NELLO E. CIOCCHETTI
BY
*Martin E. Anderson*
ATTORNEY

Patented Feb. 27, 1951

2,543,368

UNITED STATES PATENT OFFICE 2,543,368

LATERALLY FLEXIBLE POWER-OPERATED CONVEYER

Taze W. Jones and Nello E. Ciocchetti, Weld County, Colo., assignors of one-sixth to Sam Di Paolo, Frederick, Colo.

Application November 13, 1946, Serial No. 709,592

4 Claims. (Cl. 198—109)

This invention relates to laterally flexible power operated conveyors.

In the loading and unloading of freight cars, as well as in many other places, a power operated conveyor is of great service and it is well known that conveyors for this purpose have been invented and shown in prior patents.

It is the object of this invention to produce a simple and substantial conveyor of the type indicated which can be operated in a straight line or curved through ninety degrees in either direction from the center line.

Another object of the invention is to produce a conveyor of the type indicated having two end sections that are interconnected by any number of intermediate sections so that it may be made of any desired length without entailing any material increase in cost or alteration in basic design.

A further object of the invention is to produce a conveyor of the type indicated in which the conveyor belt elements shall be interconnected by means of a chain cable of an ordinary construction, whereby no special production tools or dies become necessary in the manufacture of the flexible tension element.

A further object is to produce a conveyor element in which supporting plates are welded or attached to spaced links of the conveyor chain, in overlapping or "shingled" relation, so that they may adjust themselves angularly in turning corners.

A still further object of the invention is to produce a power operated conveyor that will operate in either direction and carry things up or down an incline.

Another object of the invention is to produce a power section for use in such a conveyor that is self-contained and to which any number of sections may be attached to obtain the desired length.

Another object of the invention is to produce a conveyor of a type mentioned which shall have means for automatically maintaining the flexible conveyor element under a predetermined tension.

A further object is to produce a power operated flexible conveyor that shall be of such a design that it may be constructed from structural elements of such shape and size that they may be readily procured on the market.

The above and other objects that may become apparent as this description proceeds, are attained by means of a construction and an arrangement of parts that will now be described in detail and for this purpose reference will be had to the accompanying drawings in which the invention has been illustrated in its preferred form, and in which:

Figure 1 is a top plan view showing a five section conveyor arranged so as to effect a ninety degree turn;

Figure 2 is a top plan view of the hinged portions of two adjacent conveyor sections, the supporting plates being removed;

Figure 3 is a view somewhat similar to that shown in Figure 2, and shows the relationship of the plates at a twenty-two and one-half degree angular turn;

Figure 4 is a section taken on line 4—4, Figure 3, and shows the position of the chain links with respect to their guide and with respect to the conveyor plates;

Figure 5 is a transverse section taken on line 5—5, Figure 4;

Figure 6 is a side elevation of the power unit showing the same connected to one of the intermediate sections;

Figure 7 is a side elevation showing the other end section of the conveyor connected with one of the intermediate sections;

Figure 8 is a vertical transverse section taken on line 8—8, Figure 7;

Figure 9 is a transverse section taken on line 9—9, Figure 7;

Figure 10:
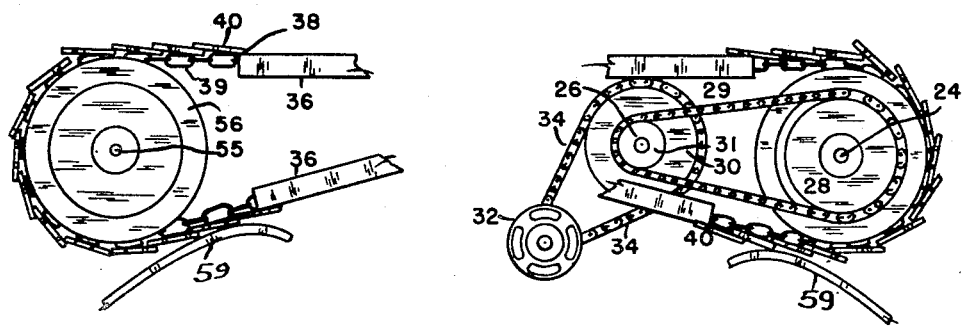
Figure 10 is a diagram showing the relationship of the motor, the sprocket chains, the cable and the cable guide.

In the drawing reference numeral 15 designates a supporting surface such, for example, as the surface of a freight car or loading platform and reference numeral 16 designates the entire conveyor which, in the present embodiment has been shown as comprising five hingedly interconnected sections, the section designated by A in Figure 1 is the power unit. Sections B represent intermediate sections and are all of the same size and shape, and section C is the end unit.

Figure 11:
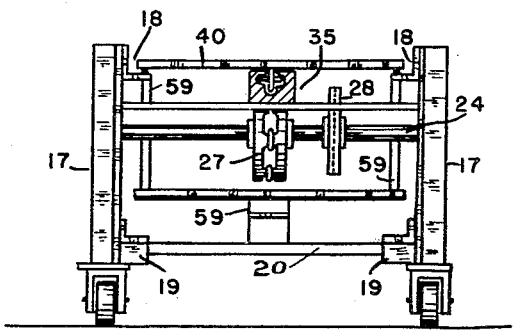
Figure 11 is a section taken on line 11—11, Figure 6.

We will now describe section A which consists of four vertical corner posts 17, that are preferably made from angle iron and are interconnected along their upper ends by angle iron bars 18 and at a point below by means of similar angle iron bars 19 that are inclined in the manner shown in Figure 6. The lower ends of angle irons 19 are interconnected by means of a bar 20. Two spaced vertical extending angle irons 21 are secured to the outer flanges of angle irons 18 and 19, one on each side. Angle irons 22 carry bearings 23, in which is journaled shaft 24, and angle irons 21 carry bearings 25 in which is journaled a shaft 26. Shaft 24 carries a chain pulley 27 of the type shown in Figure 11 and in addition a sprocket wheel 28 with which the sprocket chain 29 is operatively connected. Shaft 26 extends through from one side of the machine to the other and at one of its outer ends it has secured to it a sprocket wheel 30 and a smaller sprocket wheel 31. Chain 29 operatively connects sprocket wheel 28 with sprocket wheel 31 so as to transfer motion from the latter to the former. A motor 32 is fastened underneath the power unit and is secured between transversely extending angle irons 33. A sprocket chain 34 transmits power from the motor to sprocket wheel 30 and therefore when the motor operates it turns shaft 26 and sprocket wheel 31 and from the latter motion is transmitted to shaft 24 by chain 29. In this explanation sprocket wheel 27 will be considered as rotating in a clockwise direction, although it may be rotated in the other direction, if desired. The two corner posts 17 at the left hand end (Figure 6) are connected at a point between the adjacent ends of bars 18 and 19 by a channel, like that indicated by reference numeral 35 in Figure 9. Secured to the power unit and positioned in the plane of the chain pulley, are chain guides 36. One of these is positioned directly beneath the plane of the flanges of angle irons 18 and the other is upwardly inclined from right to left.

Figure 12:
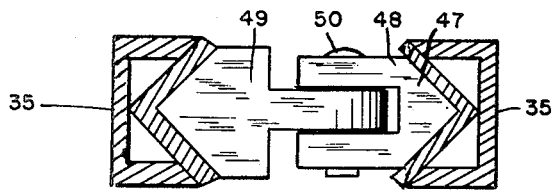
Figure 12 is a section taken on line 12—12, Figure 6.

Referring now more particularly to Figures 4 and 5, it will be seen that the guides 36 are formed from substantially rectangular metal bars or castings having an opening of the shape shown most clearly in Figure 5; that the opening extends through one side so as to form a slot 37 and has a substantially three-leafed clover shape for the reception of the cable chain. The horizontal links have been designated by reference numeral 38 and the vertical ones by reference numeral 39. The upper edge of each link 39 extends above the upper surface of the guide and has welded to it a plate 40. In the present embodiment the plates overlap each other in a manner which may be referred to as "shingled." This overlap has been shown most clearly in Figure 4 where it has been designated by reference numeral 41. The welding has been designated by reference numeral 42. Lower guide 36 has its lowermost end supported by a transverse bar 43 that is shown in Figure 6. The guides 36 are so positioned that the chain that leaves pulley 27 will depart from the latter in a tangential direction. The intermediate sections that have been designated by the letter B are constructed somewhat as shown in Figures 6 and 9, that is, each is provided with a longitudinally extending angle iron 44 whose flanges are turned inwardly and by similar angle irons 45 positioned some distance below. The two angle irons 44 and 45 are interconnected by means of bars 46 so as to form a rectangular section like that shown in Figure 9. The vertical bars 46 are interconnected by means of a channel 35 whose flanges face outwardly, as shown in Figure 12, and which have welded thereto angle irons 47 so as to form a strong and rigid member. Welded or otherwise secured to angle irons 47 are hinge members 48 and 49, that are connected by hinge pin 50 so as to permit the parts to turn relative to each other in a manner most clearly shown in Figure 2. The guide members 36 are welded or otherwise secured to the upper and lower flanges of channels 35 in the manner shown in Figure 9.

At the other end of the conveyor is an end section C that is constructed in a manner very similar to section A but which also differs therefrom in several particulars. Section C has corner posts 17 at one end only and has spaced upper and lower angle irons 18 and 19 that are practically identical with those shown in Figure 6. The extreme end of section C to the left in the drawing is connected by means of angle irons 17a. A flat bar 51 connects the upper and lower angles 18 and 19 on each side and a bearing guide 52 is connected between the vertical end angle iron 17a and bar 51. A bearing block 53 is slidable in the guide opening in member 52 and is acted upon by a heavy compression spring 54. A shaft 55 is journalled in bearing 53 and carries a chain pulley 56 that is of a similar construction to pulley 27, but may be of a different diameter, if desired. Guides 36 are provided the same as in section A and are supported in any suitable manner, preferably by transversely extending bars 57, as shown in Figure 8. A curved guide bar 59 is provided adjacent the lower end of the lowermost chain guide 36 for the purpose of guiding the chain into the chain guide when and if the direction is reversed. The chain guides 36 terminate quite close to the pivot pins 50 and therefore the chain may freely pass from one of the chain guides to the other, as their ends are quite close together at all times.

In order to permit the plates 40 to slide with less friction along the inwardly extending flanges of angle irons 18, the latter have been provided on their upper surfaces with round bars 58 that are shown most clearly in Figure 2. These bars have their ends curved somewhat as indicated at 60 and 61, so as to permit the sections to bend relative to each other in either direction.

In Figure 1 the five sections have been shown, each making an angle of twenty-two and one-half degrees with its adjacent section so that the total extent of the bend is ninety degrees. By adding more sections B the angular relation between the sections may be made smaller.

Let us now assume that the conveyor has been constructed in the manner illustrated and that current is applied to motor 32 in such a way as to cause the upper side of the flexible conveyor to move towards the right when viewed as in Figures 6 and 7. The flexible conveyor chain will, of course, move in response to the rotation of pulley 27, carrying with it the overlapping plates 40. If the conveyor is straight, it is evident that there is no change of any importance between adjacent plates so long as they are traveling in a straight line. When the conveyor chain passes around the end pulleys, the plates will separate somewhat as indicated in Figure 6.

If the section is now bent to either side, it is evident that the plates 40 will have to move angularly with respect to each other, finally arriving in a position substantially like that shown in Figure 3. Due to the overlap of the plates, this relative angular movement can take place without effecting any binding and as soon as the turn has been negotiated, they will again assume their normal position. Since the material transported is usually some sort of packing case the slight sliding action of the plates relative to the burden supported by the conveyor is easily effected without producing any abnormal strains. The links to which plates 40 are connected are also free to turn slightly with respect to the direction of movement and this, in turn, relieves the plates from any serious strains at the corners.

This conveyor can be used for loading or unloading freight cars in which case either one of the end members A or C may be positioned in the car and the other adjacent the truck from which the material is unloaded or into which it is loaded. Although it has not been shown in the drawing, it is possible with this construction to elevate one end of the conveyor to any extent desired, suitable supports for the same being provided. Where the incline is small, no adjustment of the heights at either end need to be effected and since the parts move in response to adequate power, they will carry heavy packages upwardly as well as downwardly.

Particular attention is called to the manner in which the flexible conveyor is constructed, to the use of the ordinary cable chain and the guide with the three-leafed clover shaped opening. Due to the continuous guiding of the chains, except for a short distance above each pivot pin, the parts are held in alignment and this refers more particularly to plates 40, which, during the straight portions of the travel, are parallel and overlap as shown in Figure 3. In the drawings, sections B have been shown quite short and the same is true of the end sections A and C. It is evident, however, that the length of the sections may be increased or decreased to suit the requirements of the device for its different uses.

Having described the invention what is claimed as new is:

1. An elongated power operated conveyor comprising; two supported end sections and a plurality of intermediate sections disposed therebetween, adjacent ends of the sections being connected together for pivotation about vertical axes intersecting a longitudinal axis of the sections, whereby the conveyor is laterally flexible, a chain pulley carried by each end section supported for rotation about a horizontal axis, the pulleys being rotatable in a vertical plane intersecting said longitudinal axis, an endless chain trained over the chain pulleys and having upper and lower runs extending longitudinally of the sections, means carried by one of the end sections operatively connected to the chain pulley carried thereby for rotating it and to move the chain along its runs, the chain having oblong endless identical links with parallel spaced legs connected at opposite ends by curved bight portions, alternate links being disposed in perpendicular intersecting planes, an elongated stationary guide on each section for each run of the chain, each guide having an elongated channel therein of a shape to guidingly receive the chain therein, the guide having a slot through which one leg of alternate links projects, opposed wall means adjacent the slot adapted to engage only the other alternate links to prevent unauthorized movement of the chain laterally of the channel, plates secured to spaced legs which project from the guides, said plates extending transversely of the conveyor, and guides extending parallel with the conveyor axis at each side thereof for guiding the ends of the plates.

2. A conveyor in accordance with claim 1 wherein the guides of adjacent sections are disposed in overlapping relation at their ends to provide a continuous guide when the sections are disposed angularly to one another.

3. A conveyor in accordance with claim 1 including a guide bar engageable with the plates at the lower run thereof and adjacent the end of a chain guide for guiding the chain into the chain guide.

4. An endless conveyor device for use in a laterally flexible conveyor, comprising; a chain having alternate links disposed in right angular planes, an elongated stationary guide having an elongated channel therein of a shape to guidingly receive the chain therein, the guide having a slot through which only a portion of alternate links projects, opposed wall means adjacent the slot adapted to engage only the other alternate links to prevent unauthorized movement of the chain laterally of the channel, transversely extending plates secured to certain of the extending portions of the links, the plates being of greater width than their spacing with adjacent edges in overlapping relationship.

TAZE W. JONES.
NELLO E. CIOCCHETTI.

REFERENCES CITED

The following references are of record in the file of this patent:

UNITED STATES PATENTS

| Number | Name | Date |
| --- | --- | --- |
| 1,000,107 | Morris | Aug. 8, 1911 |
| 1,816,327 | Hise | July 28, 1931 |
| 2,250,933 | Manierre | July 29, 1941 |